United States Patent
Nguyen et al.

(10) Patent No.: US 10,320,670 B2
(45) Date of Patent: Jun. 11, 2019

(54) ROUTERS WITH NETWORK PROCESSING UNIT AND CENTRAL PROCESSING UNIT-BASED LINE CARDS

(71) Applicant: AT&T Intellectual Property I, L.P., Atlanta, GA (US)

(72) Inventors: Han Q. Nguyen, Marlboro, NJ (US); Huajin Jeng, San Diego, CA (US); Tuan Duong, Eatontown, NJ (US); Kang Xi, Morganville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 252 days.

(21) Appl. No.: 14/970,403

(22) Filed: Dec. 15, 2015

(65) Prior Publication Data

US 2017/0171076 A1  Jun. 15, 2017

(51) Int. Cl.
*H04L 12/741* (2013.01)
*H04L 12/747* (2013.01)

(52) U.S. Cl.
CPC .......... *H04L 45/745* (2013.01); *H04L 45/742* (2013.01)

(58) Field of Classification Search
None
See application file for complete search history.

(56) References Cited

U.S. PATENT DOCUMENTS

| | | | |
|---|---|---|---|
| 6,633,565 B1 * | 10/2003 | Bronstein | H04L 49/3009 370/392 |
| 7,898,957 B2 | 3/2011 | Lea et al. | |
| 8,023,421 B2 | 9/2011 | Lloyd et al. | |
| 8,270,399 B2 | 9/2012 | Holst et al. | |
| 8,614,946 B1 | 12/2013 | Noble | |
| 8,619,766 B2 | 12/2013 | Wang et al. | |
| 8,842,688 B2 | 9/2014 | Vahdat et al. | |
| 9,001,647 B2 | 4/2015 | Smith | |
| 9,059,872 B1 | 6/2015 | Brar et al. | |
| 9,094,237 B2 | 7/2015 | Barnes et al. | |
| 9,106,564 B2 | 8/2015 | Marr | |
| 9,118,607 B2 | 8/2015 | Brar et al. | |
| 9,130,883 B2 | 9/2015 | Mattson | |
| 9,356,838 B1 * | 5/2016 | Wang | H04L 41/12 |

(Continued)

OTHER PUBLICATIONS

Farrington, Nathan "Data Center Switch Architecture in the Age of Merchant Silicon". 2009. pp. 1-10.

(Continued)

*Primary Examiner* — Yaotang Wang (57) ABSTRACT

A router may include a central processing unit-based line card storing a forwarding table that includes a first set of entries, a network processing unit-based line card storing a partial forwarding table that includes a second set of entries comprising a subset of the first set of entries, where the second set of entries comprises entries that are most utilized by a plurality of line cards of the router, and a route controller for updating the second set of entries to comprise the entries that are the most utilized. The network processing unit-based line card may forward a packet when an entry in the partial forwarding table matches the packet and may forward the packet to the central processing unit-based line card to forward the packet when there is no entry in the partial forwarding table of the network processing-unit based line card that matches the packet.

20 Claims, 3 Drawing Sheets

(56) References Cited

U.S. PATENT DOCUMENTS

| | | | | |
|---|---|---|---|---|
| 10,079,761 B2* | 9/2018 | Banerjee | ............... | H04L 45/745 |
| 2004/0215819 A1 | 10/2004 | Tsuruoka et al. | | |
| 2011/0122874 A1* | 5/2011 | Pacella | ................... | H04L 45/00 |
| | | | | 370/392 |
| 2011/0225207 A1* | 9/2011 | Subramanian | ........ | H04L 45/586 |
| | | | | 707/803 |
| 2014/0146824 A1* | 5/2014 | Angst | ..................... | H04L 45/54 |
| | | | | 370/401 |
| 2016/0173371 A1* | 6/2016 | Bays | ....................... | H04L 45/42 |
| | | | | 370/389 |

OTHER PUBLICATIONS

Singh, Arjun "Jupiter Rising: A Decade of Clos Topologies and Centralized Control in Google's Datacenter Network". 2015. pp. 1-15.
Vandat, Amin "Scale-Out Networking in the Data Center". 2010. pp. 1-13.
Rexford, Jennifer "Routers". Fall 2006. pp. 1-43.

* cited by examiner

ROUTERS WITH NETWORK PROCESSING UNIT AND CENTRAL PROCESSING UNIT-BASED LINE CARDS

The present disclosure relates generally to network routers, and more particularly, to methods, computer-readable media and devices for utilizing a commodity silicon-based line card to forward a packet when a merchant silicon-based line card does not have a matching entry for the packet.

BACKGROUND

Internet service provider (ISP) Internet backbone routers, in particular provider-edge (PE) routers, make use of packet-processing engines that are based on expensive custom silicon, e.g., application specific integrated circuits (ASICs), to achieve both high packet-processing rates and to store a large forwarding table or forwarding information block (FIB) to hold a full set of Internet and customer routes. For example the forwarding table may store 750,000 to more than 1,000,000 entries.

SUMMARY

In one example, the present disclosure discloses a router comprising a central processing unit-based line card storing a forwarding table that includes a first set of entries, and a network processing unit-based line card storing a partial forwarding table that includes a second set of entries. In one example, the second set of entries may comprise a subset of the first set of entries, the second set of entries may comprise entries that are most utilized by a plurality of line cards of the router, and the plurality of line cards may include the central processing unit-based line card and the network processing unit-based line card. In one example, the network processing unit-based line card is for forwarding a packet received at the router when an entry in the partial forwarding table of the network processing unit-based line card matches the packet, and for forwarding the packet to the central processing unit-based line card to forward the packet using the forwarding table stored by the central processing unit-based line card when there is no entry in the partial forwarding table of the network processing-unit based line card that matches the packet. The router may further include a route controller for updating the second set of entries in the partial forwarding table to comprise the entries that are the most utilized by the plurality of line cards of the router.

In another example, the present disclosure discloses a method, computer-readable medium, and device for updating a partial forwarding table. For example, a processor may receive utilizations of a first set of entries in a forwarding table of a central processing unit-based line card of a router and utilizations of a second set of entries in a partial forwarding table of a network processing unit-based line card of the router, where the second set of entries comprises a subset of the first set of entries, where the second set of entries comprises entries that are most utilized by a plurality of line cards of the router, and where the plurality of line cards includes the central processing unit-based line card and the network processing unit-based line card. The processor may further update the second set of entries in the partial forwarding table to comprise the entries that are the most utilized by the plurality of line cards of the router. In one example, the network processing unit-based line card is for forwarding a packet received at the router when an entry in the partial forwarding table of the network processing-unit based line card matches the packet and for forwarding the packet to the central processing unit-based line card to forward the packet using the forwarding table of the central processing unit-based line card when there is no entry in the partial forwarding table of the network processing-unit based line card that matches the packet.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure relates to a router, e.g., a provider edge router, or core router for use in a telecommunication service provider network that includes one or more line cards comprising merchant silicon network processing units (NPUs), and one or more line cards comprising commodity silicon central processing units (CPUs). Custom ASIC-based line cards that are typically used in layer 3 Internet routers generally have high packet forwarding throughput and large forwarding tables, but are expensive. In contrast, merchant silicon NPU-based line cards, referred to herein as type-I forwarders, are generally less expensive, and have high packet forwarding throughput, but may have limited memory capacity for storing forwarding table entries. For example, full Internet routing tables, including Internal routing of the telecommunication service provider network (e.g., routing table entries) may comprise 750,000-800,000 entries or more. Merchant silicon NPU-based line cards are primarily designed for data center applications where a full Internet routing table is not required, and may therefore have a capacity of approximately 150,000-250,000 forwarding table entries. (A smaller portion of the capacity may also be dedicated to forwarding entries for label switched routing, as described in greater detail below). Thus, a defining feature of a merchant silicon NPU/type-I forwarder is that it has limited forwarding memory space and cannot store a full forwarding table. In addition, a commodity silicon CPU-based line card, referred to herein as a type-II forwarder, may have slower packet forwarding throughput as compared to an NPU-based line card or a custom ASIC-based line card, but large, essentially unlimited forwarding memory capacity for storing forwarding table entries in a forwarding memory space. A commodity silicon CPU-based line card/type-II forwarder may comprise a server having an x86 architecture for example.

In one embodiment, example type-I forwarders, type-II forwarders, and custom ASIC-based routers can each store a full routing table in a routing memory space. For example, a routing memory space may be used to store a routing information block (RIB) (e.g., a "routing table"). In addition, in one example the routing memory space may further store a label information block (LIB) with routing entries for multi-protocol label switching (MPLS). In one example, the routing memory space may comprise dynamic random access memory (DRAM) or the like, and may be controlled by a microprocessor, e.g., an X86-based processor. However, The RIB and LIB cannot be used to forward packets. Thus, in one example, the RIB and LIB may be digested by the forwarders or ASIC-based routers into forwarding information block (FIB) (e.g., a "forwarding table") and label forwarding information block (LFIB) formats. The FIB and LFIB may then be stored into the forwarding memory of the respective forwarder or ASIC-based router. In one example, the FIB and LFIB formats may be specific and unique to the particular forwarding technology that is implemented in the system. In one example, the forwarding memory of a type-I forwarder may be a cache memory, e.g., integrated with the NPU.

In one embodiment, a limited or partial forwarding table is stored in the forwarding memory of one or more type-I forwarders, while a full forwarding table is stored in the forwarding memory of one or more type-II forwarders. All packets received at the router are initially provided to a type-I forwarder. If there is a matching entry in the partial forwarding table of the type-I forwarder, the packet is forwarded according to the entry via the type-I forwarder. For example, the type-I forwarder may inspect a header of the packet for a destination address and compare the destination address to an address in an entry of the partial forwarding table. In another example, the matching of a packet or flow to an entry involves comparing additional packet header fields, such as a source address, a source port number, a destination port number, and so forth. For instance, in some cases packets in different flows that are destined for a same destination may be routed differently based upon the source of the packets. When there is no matching entry, the packet is passed to a type-II forwarder where a match may be found using the full forwarding table, and forwarded toward the destination via the type-II forwarder based upon the matching entry. This architecture is based upon the observation that approximately ten percent of all forwarding table entries in a full forwarding table of a layer 3 router may be used to forward approximately 95 percent of all traffic. Thus, almost all traffic can be quickly switched using a type-I forwarder. For example, a type-I forwarder may process a packet at or near wire speed when there is matching entry in the partial forwarding table of the type-I forwarder. For instance, wire speed may comprise at least 100 gigabits per second (Gbps). Any packets that do not have a match in the partial forwarding table of the type-I forwarder may be processed by a type-II forwarder using the full forwarding table. Although the type-II forwarder may process packets at less than wire speed (e.g., less than 100 Gbps), only a small percentage of packets may be handled in this way.

In one example, both the type-I and type-II forwarders collect usage statistics for the entries in the respective forwarding tables stored by each line card. The usage statistics are provided to a route controller of the router. The route controller may determine a full routing table based upon route advertisements for various destinations from various route reflectors in the network and from routers in external network, e.g., from provider edge (PE) routers in other domains. In addition, the route controller may collect the usage statistics from the type-I and type-II forwarders to determine the entries in the full forwarding table that are the most utilized. These entries are then stored in the partial forwarding tables of the type-I forwarders, while the full forwarding table is stored in each of the type-II forwarders.

The partial forwarding tables of the type-I forwarders may be updated from time to time by the route controller based upon changing usage statistics associated with various entries.

In one example, the number of type-II forwarders that are in use in the router may be dynamically adjusted, e.g., based upon an increased router load, based upon a type-I forwarder being taken offline or out of service, and so forth. For instance, the type-II forwarders may comprise commodity silicon CPUs, which are relatively inexpensive. Thus, a number of type-II forwarders may be included in the router. However, several of the type-II forwarders may be kept powered off until needed. In another example, a type-II forwarder may comprise a software-defined or cloud-based component, where multiple type-II forwarders may be instantiated and released by the route controller as needed or desired. For instance, multiple type-II forwarders may be created as virtual machines on a single host device, e.g., a server, or on multiple host devices comprising the router. These and other aspects of the present disclosure are discussed in greater detail below in connection with the examples of FIGS. 1-3.

Figure 1:
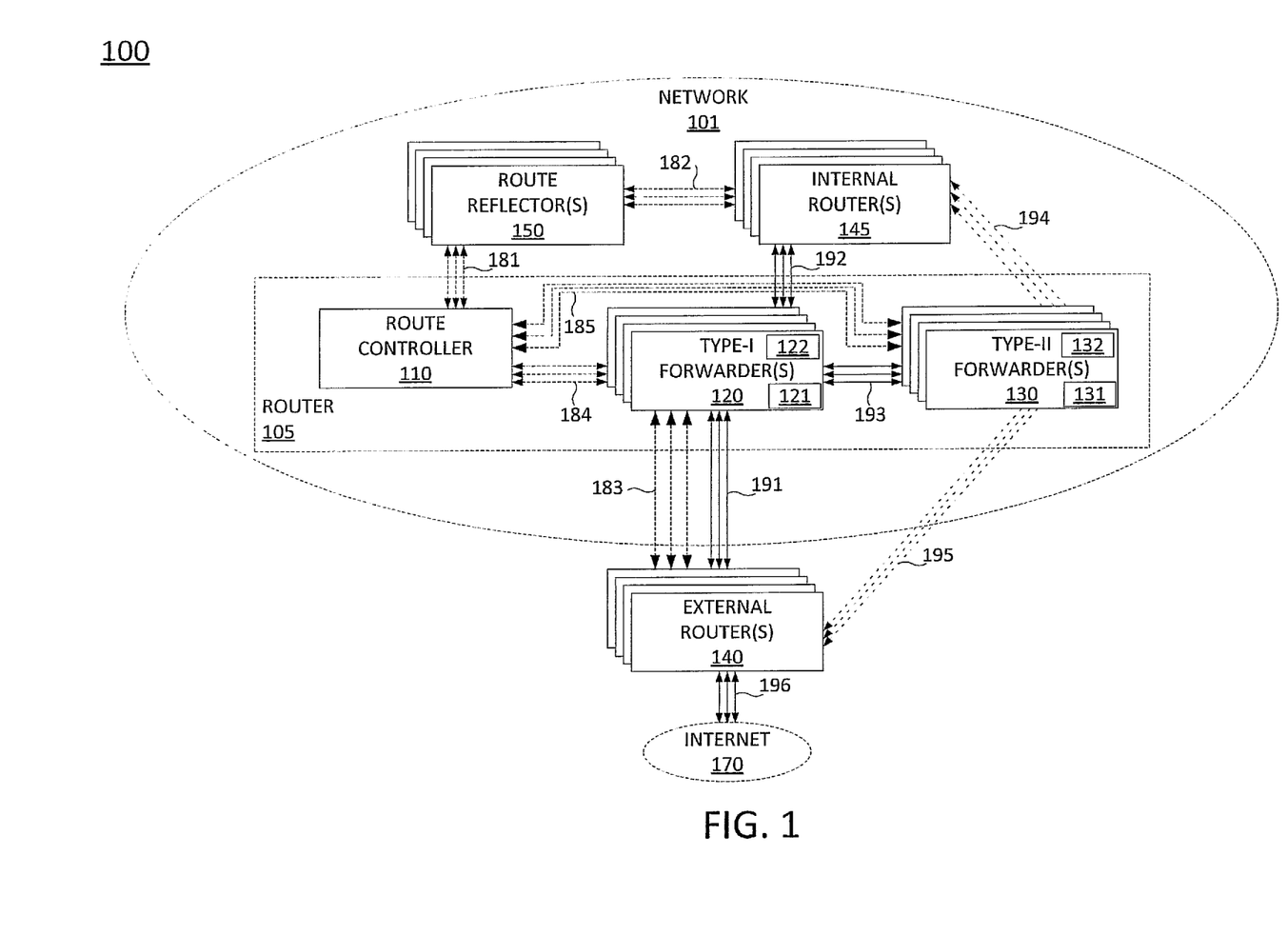
FIG. 1 illustrates an example system related to the present disclosure.

To aid in understanding the present disclosure, FIG. 1 illustrates a block diagram depicting one example of a network, or system 100 suitable for use in connection with examples of the present disclosure. The overall system 100 may include any number of interconnected networks which may use the same or different communication technologies. As illustrated in FIG. 1, the system 100 comprises a network 101, which may comprises a packet network, such as an Internet Protocol (IP) network. It should be noted that an IP network is broadly defined as a network that uses Internet Protocol to exchange data packets. In one example, network 101 may comprise an IP Multimedia Subsystem (IMS) network, a multi-protocol label switching (MPLS)/IP network, and so forth. In one example, the network 101 may be operated by a telecommunications service provider. For instance, network 101 may comprise a cellular backhaul network, a transport network, an integrated triple-play service network, an Internet service provider (ISP) network, and so on.

As illustrated in FIG. 1, network 101 includes a number of components, such as one or more internal routers 145, one or more route reflectors 150, and a router 105 (e.g., a provider edge router, a layer 3 router, a core router, etc.). In one example, router 105 includes a route controller 110, one or more type-I forwarders 120, e.g., merchant silicon NPU-based line cards, and one or more type-II forwarders, e.g., commodity silicon CPU-based line cards. In one example, the router controller 110 receives route advertisements and route updates from the route reflector(s) 150 via links 181. The route reflector(s) 150 may receive route advertisements from internal router(s) 145 via links 182. The route advertisements may be based upon an interior gateway protocol (IGP)/intra-domain routing protocol, such as open shortest path first (OSPF), routing information protocol (RIP), intermediate system to intermediate system (IS-IS), internal border gateway protocol (iBGP) or the like. Links 181 and 182 represent communication channels that are established over various physical paths through the network 101 that may include any number of intermediate devices, e.g., additional routers, switches, and the like (not shown), and the physical connections between the router 105, route reflector(s) 150, internal router(s) 145 and any such intermediate devices.

In one example, route controller 110 also receives route advertisements from one or more external routers 140 via links 183 and 184. Links 183 may represent communication channels that are established over physical links 191. For instance, external router(s) 140 and router 105 may exchange routing information, e.g., for a routing table or routing information base (RIB) via border gateway protocol (BGP) or another exterior gateway protocol (EGP)/inter-domain routing protocol via link 183 and subsequently pass this routing information to route controller 110 via link 184. Furthermore, router 105 learns routing information about network 101 and internal routers 145 from route controller 110 via link 184 and may pass this routing information to external router(s) 140 which may be deployed in one or more external networks and may be connected to the Internet 170 via links 196. The route controller 110 may construct a full routing table, e.g., a master routing table, for the router 105 using the route advertisements received from route reflector(s) 150 pertaining to destinations internal to network 101 and the route advertisements received from external router(s) 140 pertaining to destinations that are external to network 101. In one example, the full routing table may comprise a routing information block (RIB). In one example, the full routing table may also include a multiprotocol label switching (MPLS) label information block (LIB).

In one example, a full forwarding table for use by type-II forwarder(s) 130 may be comprised of a forwarding information block (FIB). In one example, the full forwarding table may further include a MPLS label forwarding information block (LFIB). The LIB and LFIB contain the topological routing and forwarding information used by internal routers 145, type-I forwarders 120, and type-II forwarders 130 to reach one another and to transfer the payload traffic. In one example, an LIB and LFIB store preferred egress interfaces for reaching a destination, as opposed to a full set of all paths to reach a destination. For example, when there are multiple paths to reach a destination, the route controller 110 may make choices as to which one is closer or a lowest cost route, and so forth. In one example, an entry in an LIB and/or an LFIB may be associated with multiple destination addresses. For example, a single egress interface can be represented by a single LFIB entry from the router 105 may be used to reach all destinations in a particular network, domain, subnet, country, etc. Thus, one entry in the routing table may be associated with one or more destination addresses. In one example, LIB/LFIB are used to aggregate or represent a large set of routes or paths as a single or a few entries (for equal cost multipath). In this representation, the full LIB/LFIB entries are much fewer than the full RIB/FIB entries.

The route controller 110 may be in communication with one or more type-I forwarders 120 and one or more type-II forwarder(s) 130 of the router 105 via links 184 and 185, respectively. Links 184 and 185 represent communication channels that are established over physical mediums, e.g., one or more optical or electrical interfaces, or the like. In one example, the route controller 110 may provide a full routing table (e.g., including RIB, or RIB and LIB) to the type-II forwarder(s) 130 via links 185 to store in routing memory space 132 with instructions to ingest the full RIB/LIB into the full forwarding table to store in forwarding memory space 131 of each of the type-II forwarder(s) 130. In one example, the route controller 110 may also provide a full routing table (e.g., including RIB, or RIB and LIB) to type-I forwarder(s) 120 via links 184 to store in routing memory space 122 with instructions to ingest a portion of the RIB (and full LIB) into the forwarding memory space 121 of each of the type-I forwarder(s) 120. In other words, the partial forwarding table may include a partial FIB (e.g., a partial forwarding table) and a full LFIB. In one example, the forwarding memory space 131 and routing memory space 132 of each of the type-II forwarder(s) 130, and the routing memory space 122 of each of the type-I forwarder(s) 120 are each of sufficient capacity to store the full routing table provided by route controller 110. In other words, the full forwarding table could include all of the full routing table entries, if desired. In another, the full forwarding table (e.g., the full FIB) comprises a digested RIB with entries for a "best route" for each destination in the routing table. In contrast, the forwarding memory space 121 of each of the type-I forwarder(s) 120 is of limited capacity such that the full routing table (or the full forwarding table) cannot be stored therein. In other words, the capacity may be such that there is not an entry associated with each possible destination. In one example, a partial forwarding table (e.g., a partial FIB) and full LFIB may be stored in the type-I forwarder(s) 120 where the size of the partial forwarding table, e.g., a maximum number of entries, is capped by the capacity of the forwarding memory space 121 of each of the respective type-I forwarder(s) 120. In another example, a fixed or non-fixed lesser number of entries may be stored in the partial forwarding table of each of the respective type-I forwarder(s) 120, e.g., the top ten percent of entries in the full routing table, even though the forwarding memory space 121 may have capacity for 25 percent of the entries in the full routing table.

In one example, one or more of the internal router(s) 145 may have a same configuration as router 105. Accordingly, in one example, an initial partial forwarding table may be derived for type-I forwarder(s) 120 when router 105 is first deployed in network 101 by utilizing entries from the full forwarding table that is present in one of the internal router(s) 145. For instance, a partial routing table may be derived from an internal router 145 for a set of routes that are in closest geographic proximity or a nearest network neighbor of router 105. In one example, the partial forwarding table can be for a set of routes that represent the 95th percentile of traffic utilization that pass through an internal router 145 that is nearby to router 105, e.g., for traffic within the past two weeks, or another period of time In operation, router 105 may receive a packet, or a flow/stream of packets from one of internal router(s) 145 via links 192 or from one of external router(s) 140 via links 191 for routing to a destination. In accordance with the present disclosure, all packets received at router 105 are initially processed by a type-I forwarder 120. In one example, if router 105 comprises multiple type-I forwarders 120, a packet or flow of packets may be provided to one of the type-I forwarders 120 that is selected according to a round-robin scheduling, based upon current loads of the multiple type-I forwarders 120, and so forth. In one example, route controller 110 may handle the scheduling of type-I forwarder(s) 120 for processing incoming packet(s). In another example, a separate scheduler (not shown) may be used to coordinate which of the type-I forwarder(s) 120 is to receive an incoming packet/flow. If there is matching entry for a packet (or flow) in the partial forwarding table of the type-I forwarder 120 that is processing the packet(s), the type-I forwarder may forward the packet(s) to one of internal router(s) 145 via links 192, e.g., if the destination is internal to network 101, or if the destination is in an external network that is reachable via one of internal router(s) 145, or may forward the packet(s) to one of external router(s) 140 via links 191, e.g., if the destination is in an external network of one of the external router(s) 140, or is reachable via one of external router(s) 140.

However, if there is no matching entry for the packet (or flow) in the partial forwarding table of the type-I forwarder 120 that is processing the packet(s), then the packet(s) may be transferred to one of the type-II forwarder(s) 130 via links 193 for processing. Links 193 may comprise one or more optical or electrical interfaces for interconnecting components of the router 105. In one example, a packet or flow of packets may be provided/transferred to one of the type-II forwarder(s) 130 over links 193 that is selected according to a round-robin scheduling, based upon current loads of the multiple type-II forwarders 130, and so forth. In another example, one or more type-II forwarders 130 may be assigned or paired with each of the type-I forwarder(s) 120. Thus, if a type-I forwarder 120 fails to find a matching entry for forwarding a packet (or flow) against its partial forwarding table, the type-I forwarder 120 may transfer the packet(s) to one of the type-II forwarder(s) 130 associated with the particular type-I forwarder over links 193. As mentioned above, each of the type-II forwarder(s) 130 may include a larger forwarding memory space 131 for storing a full forwarding table. As such, the type-II forwarder 130 that is processing the packet(s) should have a matching entry for the destination of the packet/flow. Accordingly, the type-II forwarder that is processing the packet(s) may forward the packet(s) to one of internal router(s) 145 via links 194, e.g., if the destination is internal to network 101 or is in an external network that is reachable via one of internal router(s) 145, or may forward the packet(s) to one of external router(s) 140 via links 195, e.g., if the destination is in an external network of one of the external router(s) 140, or is reachable via one of external router(s) 140.

It should be noted that although links 194 are illustrated as direct paths between internal router(s) 145 and type-II forwarder(s) 130, in one example the path for links 194 actually traverse from type-II forwarder(s) 130 back over links 193 to type-I forwarder(s) 120. For example, type-II forwarder(s) 130 may prepend the packet with an MPLS header to reach the desired gateway. One of the type-I forwarder(s) 120, upon receiving an MPLS packet from one of the type-II forwarder(s) 130, may only inspect the MPLS header to match against an LFIB stored in the forwarding memory space 121. For example, as discussed above, a type-II forwarder may have the full LFIB in its forwarding table (or stored along with the forwarding table/FIB in the forwarding memory space 121) per instructions it receives from the route controller 110. In one example, an MPLS packet may be destined for external router(s) 140. In this case, one of the type-I forwarder(s) 120 acts as an label switched router (LSR), pops the MPLS label and forwards the packet to one of external router(s) 140 over links 191. In another example, an MPLS packet may be destined for one of internal router(s) 145. In this case, one of type-I forwarder(s) 120 acts as an label switched router (LSR) and may performs the necessary label operation to forward the MPLS packet to one of the internal router(s) 145 over links 192. In addition, in one example, links 181 may traverse over physical links 192. For example, communications between route reflector(s) 150 and the route controller 110 of router 105 may utilize an in-band or out-of-band control channel over shared links that are also utilized for payload data being routed via network 101. Similarly, while links 195 are illustrated as direct paths between type-II forwarder(s) 130 and external router(s) 140, the actual paths may traverse the links 193 to type-I forwarder(s) 120 and continue over links 191 from type-I forwarder(s) 120 to external router(s) 140. In addition, in one example, links 183 may traverse over physical links 191.

The type-I forwarder(s) 120 and type-II forwarder(s) 130 may track usage statistics for the entries in the respective forwarding tables (e.g., partial and full forwarding tables, respectively) stored by each line card. For instance, each time an entry is used to forward a packet or flow during a given time period, a counter associated with the entry may be incremented. In another example, packets or flows may be sampled, e.g., such that every n-th packet or flow (e.g., every $100^{th}$, every $500^{th}$, or every $1,000^{th}$, etc.) is used to increment a counter associated with an entry used to forward the n-th packet or flow. In one example, the time period may comprise a sliding window, or may comprise discrete time increments, e.g., by every 24 hours. In one example, the time period may comprise the same hour or time of day over several successive days. For instance, usage patterns may be different on weekday mornings or during the workday as opposed to weekday evenings or on weekends, thus altering the routing table entry usage statistics for these different times. The usage statistics may be provided by the type-I forwarder(s) 120 and type-II forwarder(s) 130 to the route controller 110, e.g., periodically or according to a non-periodic schedule, on the initiatives of the type-I and type-II forwarders, in response to request/polling messages from the route controller 110, and so forth. In one example, the route controller 110 may determine the entries that are the most utilized based upon the collective usage statistics from the type-I forwarder(s) 120 and type-II forwarder(s) 130.

The partial forwarding tables of the type-I forwarder(s) 120 may be updated from time to time by the route controller 110, e.g., via communication over links 184, based upon changing usage statistics associated with various entries. For instance, the route controller 110 may update the partial forwarding tables periodically, e.g., once per day, mornings and evenings, hourly, every five minutes, and so forth, when new usage statistics are received from one of the type-I forwarders 120 or type-II forwarder(s) 130, or when one of the type-I forwarder(s) 120 is deployed, reset, etc. Thus, the likelihood of fast routing of a packet/flow is maximized by caching the most utilized entries in the partial routing tables stored by the type-I forwarder(s) 120. In addition, route controller 110 may from time to time update the full forwarding tables stored by type-II forwarder(s) 130, e.g., via communication over links 185. For instance, various route advertisements received from route reflector(s) 150 and external router(s) 140 may trigger changes to the full routing table. Route controller 110 may thus maintain a full, master routing table and provide updates and/or full copies of the master routing table to type-II forwarder(s) 130, e.g., periodically or according to a non-periodic schedule, as routing information changes based upon route advertisements that are received, or when one of the type-II forwarder(s) 130 is deployed, reset, etc.

In this regard, it should be noted that in one example, a number of type-II forwarder(s) 130 that are in active use for routing may be adjusted for various purposes. For example, a minimum number, e.g., one to several type-II forwarder(s) 130, may be made "active" when there is no load or a relatively small load at router 105, e.g., 20 percent of peak capacity, 45 percent of peak capacity, etc. Additional type-II forwarder(s) 130 may be deactivated, e.g., powered-off, powered-down, maintained in a quiescent state, etc. If there is an increased load at the router 105, one or more of the additional type-II forwarder(s) 130 may be activated, e.g., powered-up or on, and/or added to a scheduling rotation of type-II forwarders for active processing of packets/flow. In still another example, one of the type-I forwarder(s) 120 may malfunction, be removed for servicing, or may otherwise be deactivated. Thus, in one example, one or more of the type-I forwarder(s) 130 that are deactivated may be activated to handle overflow workload that would otherwise be initially processed by the one of the type-I forwarder(s) 120 that is out of service.

In one example, the activation and deactivation of type-I and type-II forwarders may be coordinated by the route controller 110. For example, route controller 110 may be an entity defined in a software defined network (SDN) architecture. For instance, route controller 110 may comprise a virtual machine operating on a host device. In addition, the route controller 110 may itself define, create and destroy instances of type-II forwarder(s) 130. For instance, one or more of the type-II forwarder(s) 130 may also comprise virtual machines operating on one or more host devices, or may comprise dedicated devices, e.g., physical line cards. In one example, the route controller 110 may comprise a computing system or server, such as computing system 300 depicted in FIG. 3, and may be configured to provide one or more functions for updating a partial routing table, as described herein.

It should be noted that the system 100 has been simplified. In other words, the system 100 may be implemented in a different form than that illustrated in FIG. 1. For example, the system 100 may be expanded to include other network elements (not shown) such as border elements, routers, switches, policy servers, security devices, gateways, a content distribution network (CDN) and the like, without altering the scope of the present disclosure. Similarly, system 100 may omit various elements, substitute elements for devices that perform the same or similar functions and/or combine elements that are illustrated as separate devices. For example, route controller 110, type-I forwarder(s) 120 and/or type-II forwarder(s) 120 may comprise functions that are spread across several devices that operate collectively as a router. In another example, multiple route controllers may be included in router 105 to perform similar functions in parallel. For instance, different route controllers may be grouped with different sets of type-I forwarder(s) 120 and type-II forwarder(s) 130 for receiving usage statistics and for updating partial and full forwarding tables of the respective forwarders. In addition, as illustrated in FIG. 1, external router(s) 140 are illustrated as being outside of network 101. However, in one example, one or more of the external router(s) 140 may be controlled by a same entity that operates network 101. For instance, a telecommunications service provider may operate a network or system of diverse domains. Thus, network 101 may comprise one of the domains, while one or more of the external router(s) 140 may be deployed in a different domain that is controlled and/or operated by the same telecommunication service provider.

It should also be noted that examples of the present disclosure are described herein primarily with respect to IP networks and IP routing protocols. However, it should be understood that components of the system 100, including router 105, may include additional functions and features and are applicable to routing in additional types of packet-based networks. For example, one or more routers in network 101, e.g., internal router(s) 145 and/or router 105, may comprise a label switched router (LSR) for IP/MPLS forwarding. For instance, router 105 may receive a packet from an external router 140 as an IP packet, determine that a destination is reachable via one of internal router(s) 145 and encapsulate the IP packet with a label for label-switched routing within network 101. Router 105 may also perform virtual private network (VPN) and tunneling support functions such that routing within network 101 is not based on OSPF, or based solely on OSPF. Thus, these and other modifications of the system 100 are all contemplated within the scope of the present disclosure.

Figure 2:
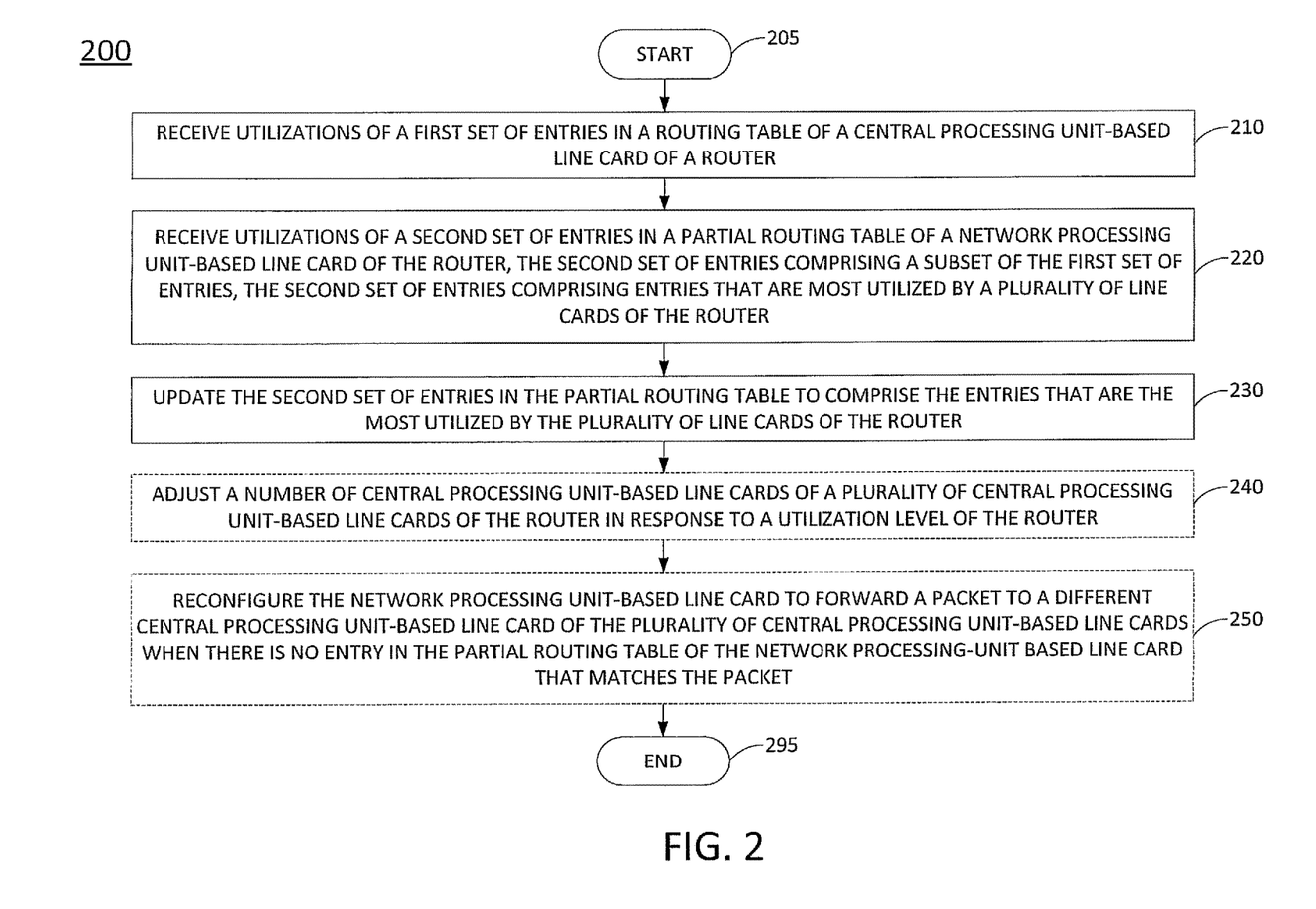
FIG. 2 illustrates a flowchart of an example method for updating a partial forwarding table, in accordance with the present disclosure.

FIG. 2 illustrates a flowchart of an example method 200 for updating a partial forwarding table, in accordance with the present disclosure. In one example, steps, functions and/or operations of the method 200 may be performed by a network-based device, e.g., router 105 and/or route controller 110 in FIG. 1, or router 105 and/or route controller 110 in conjunction with other components of the system 100. In one example, the steps, functions, or operations of method 200 may be performed by a computing device or system 300, and/or processor 302 as described in connection with FIG. 3 below. For illustrative purposes, the method 200 is described in greater detail below in connection with an example performed by a processor, such as processor 302. The method begins in step 205 and proceeds to step 210.

At step 210, the processor receives utilizations (e.g., usage statistics) for a first set of entries in a forwarding table of a central processing unit (CPU)-based line card (e.g., a type-II forwarder) of a router. For instance, each time an entry is used to route a packet/flow by the CPU-based line card during a given time period, a counter associated with the entry may be incremented by the CPU-based line card. In other words, the CPU-based line card may count the utilizations of the entries in the forwarding table. In another example, packets/flows may be sampled, e.g., such that every n-th packet or flow is used to increment a counter associated with an entry used to forward the n-th packet or flow. In one example the processor may query the CPU-based line card periodically, e.g., according to time or according to a number of packets received at the router, according to a schedule, and so forth, in order to receive the utilizations of first set of entries in the forwarding table. In another example, the CPU-based line card may report to utilizations of the forwarding table entries periodically to the processor, e.g., according to time or according to a number of packets received at the router, based upon a schedule, etc. In one example, a CPU-based line card may comprise a server having an x86 architecture-based central processing unit.

In one example, an entry may include a destination address and a route for reaching the destination address. The route may comprise an identification of an egress port or interface of the line card or router, a next hop router, or the like for sending the packet towards the destination. In one example, the entry may include additional fields, such as a source address, a size of the packet, an identification of a payload data type, a transmission control protocol (TCP) or user datagram protocol (UDP) port number, and so forth. As such, there may be multiple entries associated with a same destination address. In addition, the different entries may specify different forwardings for reaching the same destination address. Thus, in one example, the forwarding table supports forwarding based upon an n-tuple comprising the destination address and one or more additional fields. For instance, different packets/flows with the same destination address but from different source addresses, having different payload data types, etc., may be routed to the destination address via different routes.

In one example, the forwarding table of the CPU-based line card comprises a full forwarding table of the router. For instance, the forwarding table may include a full forwarding table with a full set of entries for addresses that are local to the router, e.g., the same domain and a full set of entries for Internet destinations. In another example, the forwarding table of the CPU-based line card may comprise a substantially full forwarding table of the router. For instance, the router may update a master copy of the full forwarding table that has not yet been propagated to the CPU-based line card. In another example, one or more entries of a full forwarding table may also be omitted from the forwarding table of the CPU-based line card. For instance, an operator of the router may choose to block certain destination addresses that may be contained in a master copy of a full forwarding table of the router. Thus, a redacted forwarding table may be provided to the CPU-based line card that omits entries associated with certain destination address, blocks of address, countries or regions, and so forth. In one example, the forwarding table of the CPU-based line card may comprise 500,000 or more entries, e.g., 750,000 to more than 1,000,000 entries.

In one example, the forwarding table of the CPU-based line card may comprise a forwarding table/forwarding information block (FIB) such that not all routes for reaching a particular destination address are contained in the forwarding table. In addition, in one example, the forwarding table may include entries associated with multiple destination addresses, i.e., where a single entry may be associated with one or more than one destination address. For instance, a single entry may match an entire range of destination addresses in a same domain or sub-domain. In one example, a destination address may be associated with several entries in the forwarding table. For instance, a different forwardings may be provided for packets or flows from different source addresses being sent to a same destination address using different forwarding table entries. For example, forwarding may be based upon an n-tuple of packet header fields, rather than based upon only the destination address. In one example, the forwarding table of the CPU-based line card may also include a LFIB storing forwarding entries for label-switched routes, or the LFIB may be stored in the forwarding memory space of the CPU-based line card along with the forwarding table.

At step 220, the processor receives utilizations (e.g., usage statistics) for a second set of entries in a partial forwarding table of a network processing unit (NPU)-based line card (e.g., a type-I forwarder, sometimes referred to as "merchant silicon"). The second set of entries may comprise a subset of the first set of entries in the forwarding table of the CPU-based line card. For instance, a memory capacity of a forwarding memory space of the NPU-based line card may be such that less than 500,000 entries may be stored in the partial forwarding table, e.g., 150,000 to 250,000 entries. In one example, the forwarding table of the NPU-based line card may also include a (full) LFIB storing forwarding entries for label-switched routes, or the LFIB may be stored in the forwarding memory space of the CPU-based line card along with the forwarding table. In one example, the processor may query the NPU-based line card, or the NPU-based line card may report the utilizations to the processor, e.g., periodically or according to a different scheduling, and so forth. In one example, the NPU-based line card may record the utilizations in a same or similar manner to the CPU-based line card, and as described above. For instance, the NPU-base line card may count utilizations of the second set of entries in the partial forwarding table and report the utilizations to the processor. In one example, the subset of entries in the partial forwarding table of the NPU-based line card includes entries comprising the most utilized entries contained in a full forwarding table of the router (which in one example may also comprise the forwarding table of the CPU-based line card referred to at step 210). For instance, the forwarding table of the NPU-based line card may store 30 percent or less of the total number of entries in the forwarding table of the CPU-based line card. In one example, the NPU-based line card may be configured to forward a packet received at the router according to an entry in the partial forwarding table when the entry in the partial forwarding table matches the packet, and to forward the packet to the CPU-based line card when there is no matching entry for the packet in the partial forwarding table of the NPU-based line card.

At step 230, the processor updates the second set of entries in the partial forwarding table to comprise the entries that are most utilized by a plurality of line cards of the router, where the plurality of line cards of the router include the CPU-based line card and the NPU-based line card. For example, the router may comprise a number of line cards including the CPU-based line card and the NPU-based line card, any of which may be used to forward a packet or flow of packets. Thus, in one example, the processor may collect usage statistics from a plurality of CPU-based line cards and/or a plurality of NPU-based line cards at steps 210 and 220, respectively. The processor may further sum the usage statistics from the different line cards to determine aggregate utilizations for the various entries. The processor may then determine the entries that are the most utilized by the router. For example, the processor may maintain rankings of the entries from a most utilized to a least utilized, and may update the rankings based upon the utilizations that are received at steps 210 and 220. Due to changing usage patterns driven by events such as new product announcements, major news events, online shopping sales, day/night or weekday/weekend traffic pattern changes, and so forth, the most utilized entries may change from one time period to another. As such, the entries stored in the partial forwarding table of the NPU-based line card may be outdated. Accordingly, at least a portion of the entries that have declining or flat utilizations may be replaced by entries with utilizations that have increased, or which have increased utilization rankings due to declining utilizations of other entries.

In one example, step 230 may comprise the processor sending one or more commands or messages to the NPU-based line card identifying entries to replace or delete, and providing new entries to add to the second set of entries in the partial forwarding table. It should be noted that an entry for a route that no longer exists, e.g., due to a path no longer existing and/or the destination being removed from the network, may also be removed from the partial forwarding table via step 230. For example, the processor may receive advertisements for new routes and for routes that no longer exist. Removal of non-existent routes may be handled separately, or may occur simply due to the utilization of an entry for such route declining (i.e., to zero). In another example, at step 230 the processor may provide a new partial forwarding table to replace a partial forwarding table previously being used by the NPU-based line card. In one example, the processor may send commands to the NPU-based line card to identify certain entries in a routing table stored in a routing memory space of the NPU-based line card that should be digested into the partial forwarding table of the NPU-based line card.

At optional step 240, the processor may adjust a number of CPU-based line cards of a plurality of CPU-based line cards of the router in response to a utilization level of the router. For example, the router may include a plurality of CPU-based line cards, one or more of which may be kept powered off until needed. For instance, the processor may detect an increased router load, e.g., based upon a surge in traffic, based upon an NPU-based line card being taken offline or out of service, and so forth. Thus, the processor may bring additional CPU-based line cards online in response to the changing utilization level. In another example, a new NPU-based line card may be added or an NPU-based line card reactivated, thereby handling a larger percentage of traffic at the router. Thus, one or more CPU-based line cards that are active may be deactivated in response to a relative decline in router load. In one example, a CPU-based line card may comprise a software-defined or cloud-based component, where multiple CPU-based line cards may be instantiated and released by the processor as needed or desired. For instance, multiple CPU-based line cards may be created as virtual machines on a single host device, or on multiple host devices comprising the router. In one example, the router may include two NPU-based line cards and ten or more CPU-based line cards, for instance.

At optional step 250, the processor may reconfigure the NPU-based line card to forward a packet to a different CPU-based line card of the plurality of CPU-based line cards when no matching entry is found in the partial forwarding table of the NPU-based line card for the packet. For instance, the CPU-based line card may be assigned to the NPU-based line card for transferring a packet when there is no matching entry in the partial forwarding table of the NPU-based line card for the packet. However, the CPU-based line card may be physically removed from the router or may be taken offline for servicing. In another example, a declining load of the router may cause the CPU-based line card to be powered down, or decommissioned, e.g., at optional step 240. For instance, during times of relatively heavy traffic at the router, one or several CPU-based line cards may be allocated exclusively to each NPU-based line card. Thus, the NPU-based line card may utilize several CPU-based line cards in a round-robin fashion, or may select one of the assigned CPU-based line cards having a lightest current load, and so forth. However, during times of relatively light traffic at the router, one CPU-based line card may be assigned to service multiple NPU-based line cards. Thus, in a variety of situations, a different CPU-based line card may be assigned to the NPU-based line card.

Following step 230, or following either of the optional steps 240 or 250, the method 200 may proceed to step 295. At step 295, the method 200 ends.

It should be noted that although not specifically specified, one or more steps, functions or operations of the method 200 may include a storing, displaying and/or outputting step as required for a particular application. In other words, any data, records, fields, and/or intermediate results discussed in the respective methods can be stored, displayed and/or outputted to another device as required for a particular application. Furthermore, steps or blocks in FIG. 2 that recite a determining operation or involve a decision do not necessarily require that both branches of the determining operation be practiced. In other words, one of the branches of the determining operation can be deemed as an optional step. In addition, one or more steps, blocks, functions, or operations of the above described method 200 may comprise optional steps, or can be combined, separated, and/or performed in a different order from that described above, without departing from the example embodiments of the present disclosure.

Figure 3:
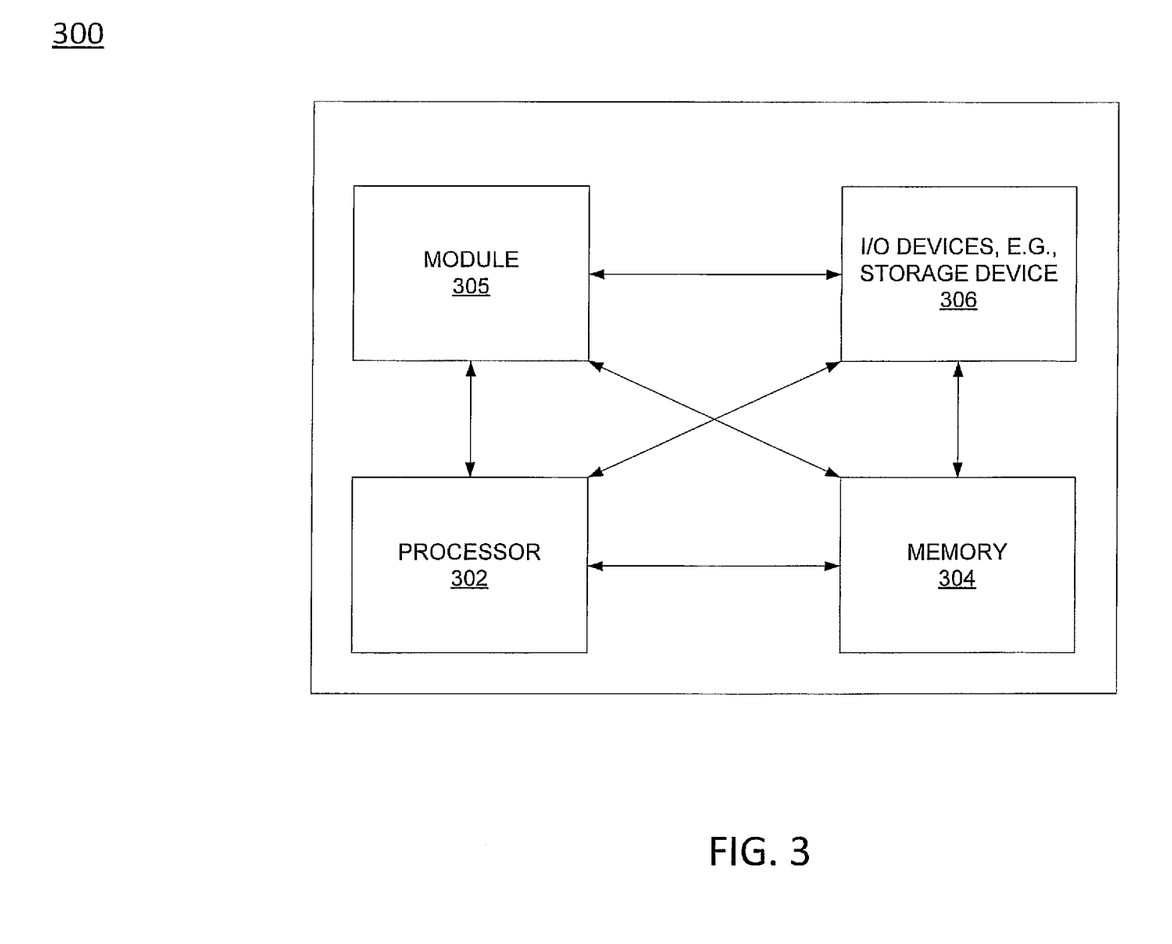
FIG. 3 illustrates an example high-level block diagram of a computer specifically programmed to perform the steps, functions, blocks, and/or operations described herein.

FIG. 3 depicts a high-level block diagram of a computing device suitable for use in performing the functions described herein. As depicted in FIG. 3, the system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for updating a partial forwarding table, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200, or the entire method 200 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one embodiment, instructions and data for the present module or process 305 for updating a partial forwarding table (e.g., a software program comprising computer-executable instructions) can be loaded into memory 304 and executed by hardware processor element 302 to implement the steps, functions or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for updating a partial forwarding table (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A router comprising:
   a central processing unit-based line card storing a forwarding table that includes a first set of entries;
   a network processing unit-based line card storing a partial forwarding table that includes a second set of entries, wherein the second set of entries comprises a subset of the first set of entries, wherein the second set of entries comprises entries that are most utilized by a plurality of line cards of the router, the plurality of line cards including the central processing unit-based line card and the network processing unit-based line card, wherein the central processing unit-based line card and the network processing unit-based line card are distinct physical devices, wherein the network processing unit-based line card is configured to forward a packet received at the router to a destination when an entry in the partial forwarding table of the network processing unit-based line card matches the packet and to transfer the packet to the central processing unit-based line card to allow the central processing unit-based line card to forward the packet to the destination using the forwarding table stored by the central processing unit-based line card when there is no entry in the partial forwarding table of the network processing unit-based line card that matches the packet; and
   a route controller for updating the second set of entries in the partial forwarding table to comprise the entries that are the most utilized by the plurality of line cards of the router.

2. The router of claim 1, wherein the central processing unit-based line card comprise an x86 architecture-based central processing unit.

3. The router of claim 1, wherein the network processing unit-based line card comprises a merchant silicon network processing unit.

4. The router of claim 1, wherein the forwarding table comprises entries for a full set of Internet destinations.

5. The router of claim 1, wherein the forwarding table comprises greater than 500,000 entries.

6. The router of claim 1, wherein the network processing unit-based line card has a capacity of less than 500,000 entries for the partial forwarding table.

7. The router of claim 1, wherein the network processing unit-based line card routes the packet at a wire speed when the packet matches the entry in the partial forwarding table.

8. The router of claim 7, wherein the wire speed is at least 100 gigabits per second.

9. The router of claim 1, wherein the central processing unit-based line card routes the packet at less than a wire speed when the packet is forwarded to the central processing unit-based line card.

10. The router of claim 9, wherein the wire speed is at least 100 gigabits per second.

11. The router of claim 1, wherein the central processing unit-based line card is one of a plurality of central processing unit-based line cards of the router, and wherein the network processing unit-based line card is one of a plurality of network processing unit-based line cards of the router.

12. The router of claim 11, wherein the plurality of network processing unit-based line cards comprises two network processing unit-based line cards, and wherein the plurality of central processing unit-based line cards comprises greater than ten central processing unit-based line cards.

13. The router of claim 11, wherein the plurality of central processing unit-based line cards comprises virtual machines hosted on at least one server.

14. The router of claim 13, wherein the route controller is further for adjusting a number of central processing unit-based line cards of the plurality of central processing unit-based line cards in response to a utilization level of the router.

15. The router of claim 11, wherein the route controller is further for reconfiguring the network processing unit-based line card to forward a further packet to a different central processing unit-based line card of the plurality of central processing unit-based line cards when there is no matching entry in the partial forwarding table of the network processing unit-based line card for the additional packet.

16. The router of claim 1, wherein the network processing unit-based line card is further for:
   counting utilizations of the second set of entries in the partial forwarding table of the network processing unit-based line card; and
   reporting to the route controller the utilizations of the second set of entries in the partial forwarding table of the network processing unit-based line card.

17. The router of claim 16, wherein the central processing unit-based line card is for:
   counting utilizations of the first set of entries in the forwarding table of the central processing unit-based line card; and
   reporting to the route controller the utilizations of the first set of entries in the forwarding table of the central processing unit-based line card.

18. The router of claim 1, wherein the router comprises a provider edge router of a telecommunication service provider network.

19. A method comprising:
   receiving, by a processor, utilizations of a first set of entries in a forwarding table of a central processing unit-based line card of a router;
   receiving, by the processor, utilizations of a second set of entries in a partial forwarding table of a network processing unit-based line card of the router, wherein the second set of entries comprises a subset of the first set of entries, wherein the second set of entries comprises entries that are most utilized by a plurality of line cards of the router, the plurality of line cards including the central processing unit-based line card and the network processing unit-based line card, wherein the central processing unit-based line card and the network processing unit-based line card are distinct physical devices, wherein the network processing unit-based line card is configured to forward a packet received at the router to a destination when an entry in the partial forwarding table of the network processing unit-based line card matches the packet and to transfer the packet to the central processing unit-based line card to allow the central processing unit-based line card to forward the packet to the destination using the forwarding table of the central processing unit-based line card when there is no entry in the partial forwarding table of the network processing unit-based line card that matches the packet; and updating, by the processor, the second set of entries in the partial forwarding table to comprise the entries that are the most utilized by the plurality of line cards of the router.

20. A device comprising:

a processor; and a computer-readable medium storing instructions which, when executed by the processor, cause the processor to perform operations, the operations comprising:

receiving utilizations of a first set of entries in a forwarding table of a central processing unit-based line card of a router;

receiving utilizations of a second set of entries in a partial forwarding table of a network processing unit-based line card of the router, wherein the second set of entries comprises a subset of the first set of entries, wherein the second set of entries comprises entries that are most utilized by a plurality of line cards of the router, the plurality of line cards including the central processing unit-based line card and the network processing unit-based line card, wherein the central processing unit-based line card and the network processing unit-based line card are distinct physical devices, wherein the network processing unit-based line card is configured to forward a packet received at the router to a destination when an entry in the partial forwarding table of the network processing unit-based line card matches the packet and to transfer the packet to the central processing unit-based line card to allow the central processing unit-based line card to forward the packet to the destination using the forwarding table of the central processing unit-based line card when there is no entry in the partial forwarding table of the network processing unit-based line card that matches the packet; and updating the second set of entries in the partial forwarding table to comprise the entries that are the most utilized by the plurality of line cards of the router.

\* \* \* \* \*